United States Patent
Nakaya et al.

(10) Patent No.: US 11,691,502 B2
(45) Date of Patent: Jul. 4, 2023

(54) FUEL TANK HAVING BUILT-IN COMPONENT WITH PILLARS

(71) Applicant: YACHIYO INDUSTRY CO., LTD., Saitama (JP)

(72) Inventors: Kazunari Nakaya, Tochigi (JP); Masaki Aono, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/799,224

(22) PCT Filed: Dec. 23, 2020

(86) PCT No.: PCT/JP2020/048274
§ 371 (c)(1),
(2) Date: Aug. 11, 2022

(87) PCT Pub. No.: WO2021/166436
PCT Pub. Date: Aug. 26, 2021

(65) Prior Publication Data
US 2023/0068961 A1 Mar. 2, 2023

(30) Foreign Application Priority Data
Feb. 21, 2020 (JP) .............................. JP2020-027751

(51) Int. Cl.
*B60K 15/03* (2006.01)

(52) U.S. Cl.
CPC ................... *B60K 15/03* (2013.01)

(58) Field of Classification Search
CPC .......... B60K 15/03; B60K 2015/03467; B60K 2015/03032; B60K 2015/03381
See application file for complete search history.

(56) References Cited

U.S. PATENT DOCUMENTS

| | | | |
|---|---|---|---|
| 2001/0009257 A1* | 7/2001 | Bauer ................. | B60K 15/077 137/574 |
| 2009/0139994 A1 | 6/2009 | Aoki et al. | |

(Continued)

FOREIGN PATENT DOCUMENTS

| | | |
|---|---|---|
| JP | 2009-132296 A | 6/2009 |
| JP | 2009-132297 A | 6/2009 |

(Continued)

OTHER PUBLICATIONS

International Search Report and Written Opinion of the International Search Report for PCT/JP2020/048274 dated Mar. 23, 2021.

*Primary Examiner* — Stephen J Castellano
(74) *Attorney, Agent, or Firm* — Kenealy Vaidya LLP

(57) ABSTRACT

Provided is a fuel tank having a built-in component placeable with high accuracy. The fuel tank has a built-in component, and the built-in component includes: a carrier as a rigid body having fittings; and pillars having fitted portions to be respectively fitted into the fittings of the carrier; wherein the fittings include at least one slidable fitting having one of the fitted portions of the pillars slidably fitted thereinto due to post-molding shrinkage of the fuel tank, and a fixed fitting having another one of the fitted portions of the pillars fitted thereinto so as not to be slidable, wherein a slidable direction of the at least one slidable fitting is directed toward the fixed fitting.

8 Claims, 18 Drawing Sheets

(56) References Cited

U.S. PATENT DOCUMENTS

| | | | |
|---|---|---|---|
| 2012/0325822 A1* | 12/2012 | Pozgainer | B60K 15/03177 |
| | | | 220/562 |
| 2016/0214477 A1* | 7/2016 | Boecker | B29C 49/20 |
| 2018/0141432 A1 | 5/2018 | Demaria et al. | |
| 2018/0335002 A1* | 11/2018 | Ikeya | F02M 37/0011 |
| 2019/0128227 A1 | 5/2019 | Amano et al. | |

FOREIGN PATENT DOCUMENTS

| | | |
|---|---|---|
| JP | 2018-114794 A | 7/2018 |
| JP | 2019-077382 A | 5/2019 |
| WO | 2021/166436 A1 | 8/2021 |

* cited by examiner

FIG. 2
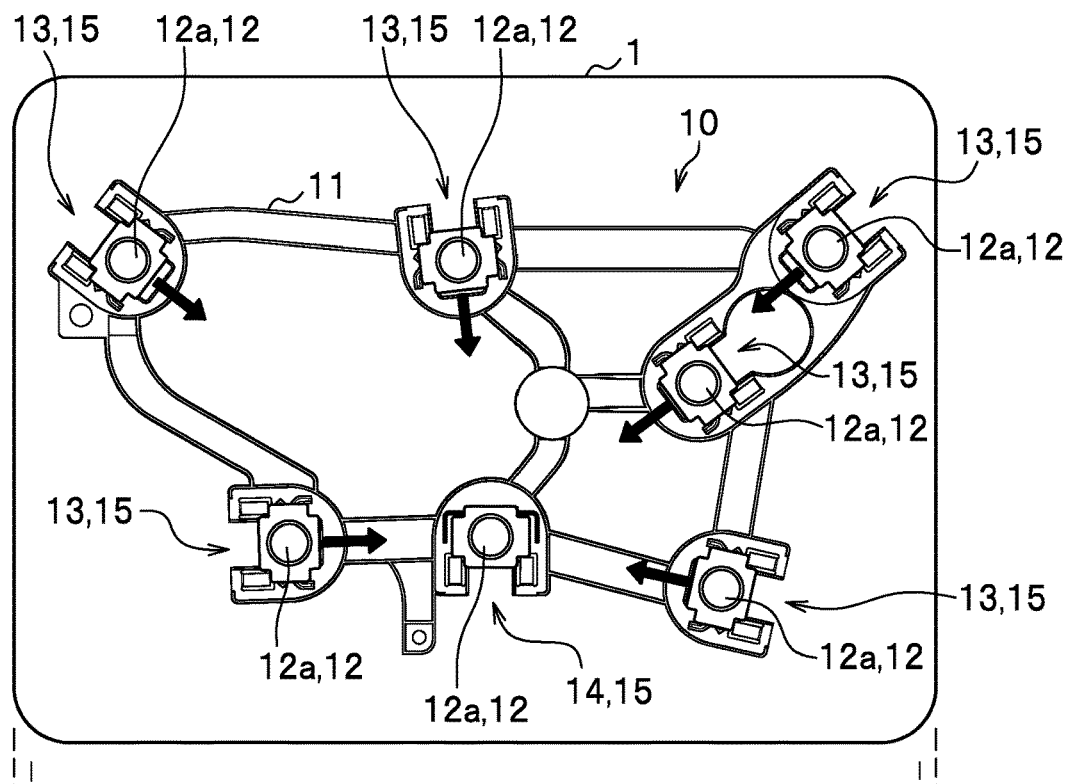
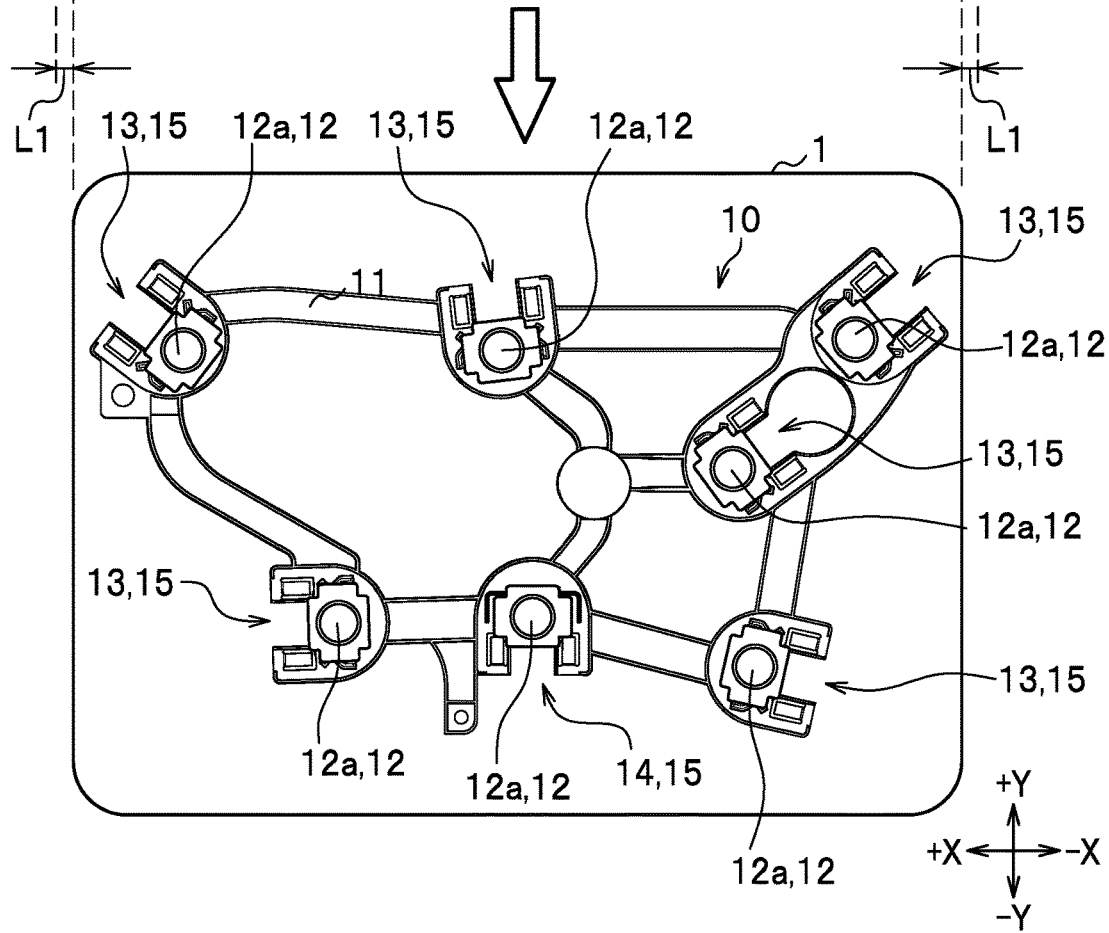

FUEL TANK HAVING BUILT-IN COMPONENT WITH PILLARS

CROSS-REFERENCE TO RELATED APPLICATION

This application is a U.S. National Stage Application under 35 U.S.C. § 371 of International Patent Application No. PCT/JP2020/048274 filed on 23 Dec. 2020, which claims the benefit of priority to Japanese Patent Application No. 2020-027751 filed on 21 Feb. 2020, the disclosures of all of which are hereby incorporated by reference in their entireties.

TECHNICAL FIELD

The present invention relates to a fuel tank.

BACKGROUND ART

A technique of absorbing shrinkage of a fuel tank after blow molding (hereinbelow, referred to as post-molding shrinkage) includes one disclosed in Japanese Patent Application Publication No. 2009-132296 (hereinafter referred to as Patent Document 1). Patent Document 1 describes a fuel tank for an automobile, which is formed by blow molding, has a built-in component inside, and has an outer wall formed with a thermoplastic synthetic resin. The built-in component is formed integrally with the synthetic resin. The built-in component is provided with mounting members to be fusion-bonded to an inner surface of the outer wall of the fuel tank, so as to be attached to the fuel tank, and dimensional-change-absorbing members to be bent in response to shrinkage or expansion of the fuel tank.

SUMMARY OF THE INVENTION

Problems to be Solved

The built-in component 20 of Patent Document 1 has the dimensional-change-absorbing members 23 provided to the beam member 22. This causes the beam member 22 to become non-rigid to hinder the built-in component 20 from being arranged in the fuel tank 1 with high accuracy. The present invention is intended to provide a fuel tank having a built-in component arranged with high accuracy.

Solution to Problems

A fuel tank of the present invention is a fuel tank having a built-in component, the built-in component including: a carrier as a rigid body having fittings; and pillars having fitted portions respectively fitted into the fittings of the carrier, wherein the fittings include at least one slidable fitting having one of the fitted portions of the pillars slidably fitted thereinto due to post-molding shrinkage of the fuel tank, and a fixed fitting having another one of the fitted portions of the pillars fitted thereinto so as not to be slidable, wherein a slidable direction of the at least one slidable fitting is directed toward the fixed fitting.

Advantageous Effects of the Invention

The present invention provides a fuel tank having a built-in component arranged with high accuracy.

BRIEF DESCRIPTION OF DRAWINGS

FIG. 2 illustrates a built-in component absorbing post-molding shrinkage of the fuel tank.

DETAILED DESCRIPTION OF EMBODIMENTS

Figure 1:
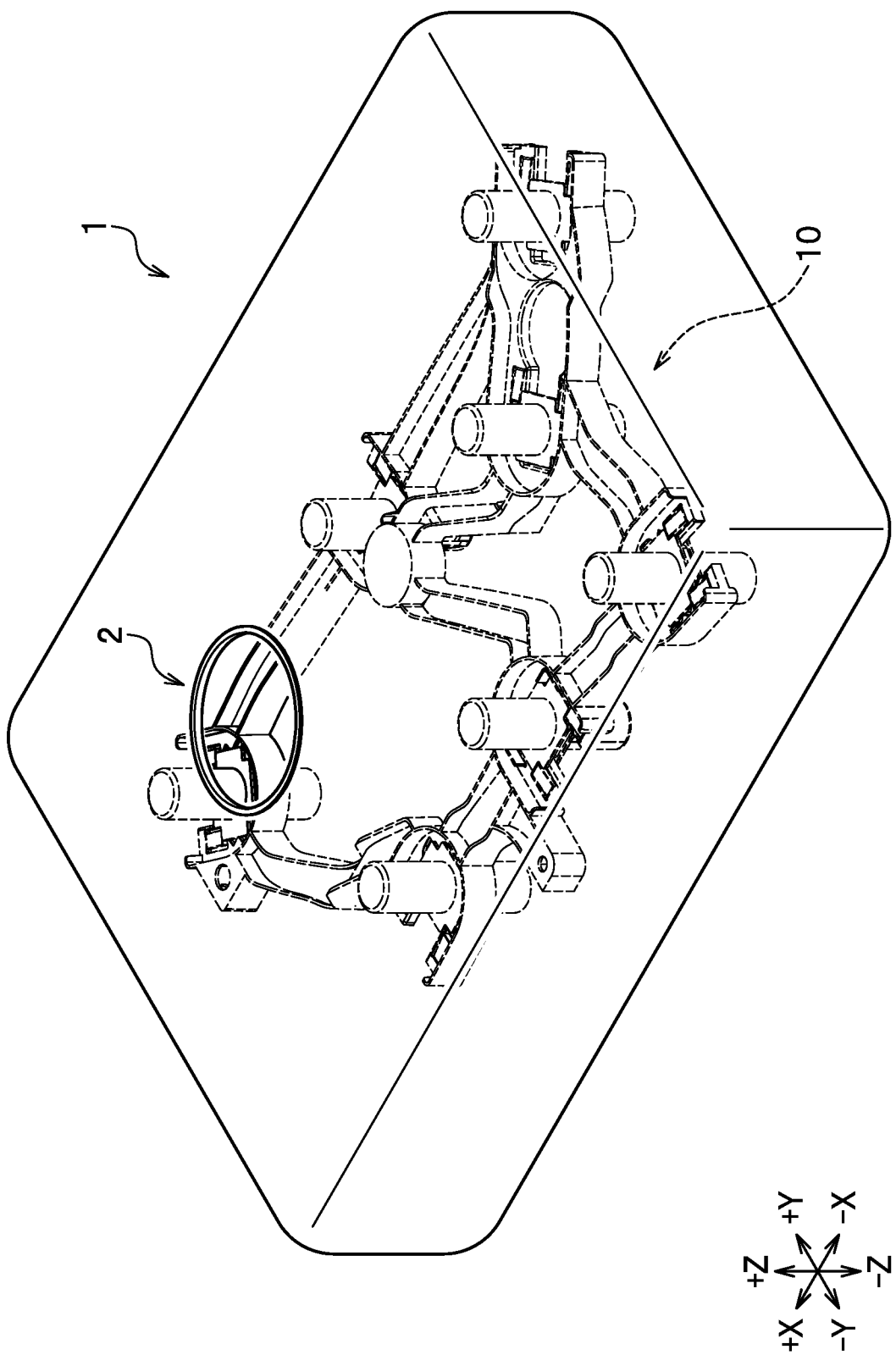
FIG. 1 is a schematic perspective view of a fuel tank.

Hereinafter, an embodiment of the present invention is described. However, the present invention is not limited to the description hereinbelow and the drawings, and can be modified in any way to the extent that advantageous effects of the present invention are not significantly impaired. The present invention can be implemented by combining different embodiments with one another. In the following description, the same components in different embodiments are denoted by the same reference numerals, and duplicate descriptions thereof are omitted. In addition, the same functions in different embodiments have the same names, and duplicate descriptions thereof are omitted FIG. 1 is a schematic perspective view of a fuel tank 1. The fuel tank 1 is shown to have a box shape with a width in an X direction, a depth in a Y direction, and a height in a Z direction. The fuel tank 1 is used for an automobile, for example, to contain gasoline, light oil, or the like. The fuel tank 1 is provided with an aperture 2 through which an oil feed pump (not shown) is set. The oil feed pump feeds fuel in the fuel tank 1 to an engine (not shown).

The fuel tank 1 has a built-in component 10 (to be described below) inside. The built-in component 10 is arranged inside the fuel tank 1 when the fuel tank 1 is blow molded, for example. That is, the built-in component 10 is placed inside a parison (not shown) in a cylindrical shape or between a pair of parisons in a sheet shape, and then the parison(s) is/are molded and cooled to have the built-in component 10 arranged inside the fuel tank 1.

The built-in component is used for absorbing post-molding shrinkage when the fuel tank 1 is cooled after blow molding, absorbing expansion or shrinkage of the fuel tank 1 in use due to a positive or negative pressure inside, and absorbing waves. Post-molding shrinkage is described below, with reference to FIGS. 2 and 3.

FIG. 2 illustrates the built-in component 10 absorbing post-molding shrinkage of the fuel tank 1. FIG. 2 shows the inside of the fuel tank 1 visible for the purpose of illustration. Particular configuration of the built-in component 10 is described below, with reference to FIG. 3 and beyond. The built-in component 10 is fixed to the parison (not shown) as a material of the fuel tank 1 by upper surfaces 12*a* and lower surfaces (not shown) of pillars 12 fitted into fittings 15. Accordingly, forces are applied to the pillars 12 in directions of the pillars being shrunk during post-molding shrinkage due to the parison being cooled.

Post-molding shrinkage is generally homologous deformation. This causes the one or more slidable (movable) pillars 12 (the one or more pillars 12 fitted into one or more slidable fittings 13 to be described below) to be applied with forces towards the fixed pillar 12 (the pillar 12 fitted into a fixed fitting 14 to be described below). Directions of the forces are indicated by solid arrows in an upper diagram in FIG. 2. When forces are applied to the one or more pillars 12 due to post-molding shrinkage of L1 in length, the one or more slidable pillars 12 slide toward the single fixed pillar 12. The built-in component 10 after the sliding is indicated in a lower diagram in FIG. 2.

The one or more slidable pillars 12 sliding toward the fixed pillar 12, as described above, allow for absorbing post-molding shrinkage, which is homologous deformation, to prevent the pillars 12 from being separated or detached from inner walls of the fuel tank 1 due to post-molding shrinkage. As a result, the built-in component 10 is held inside the fuel tank 1 even after post-molding shrinkage, so that the built-in component 10 prevents the fuel tank 10 in use or the like from being deformed.

Figure 3:
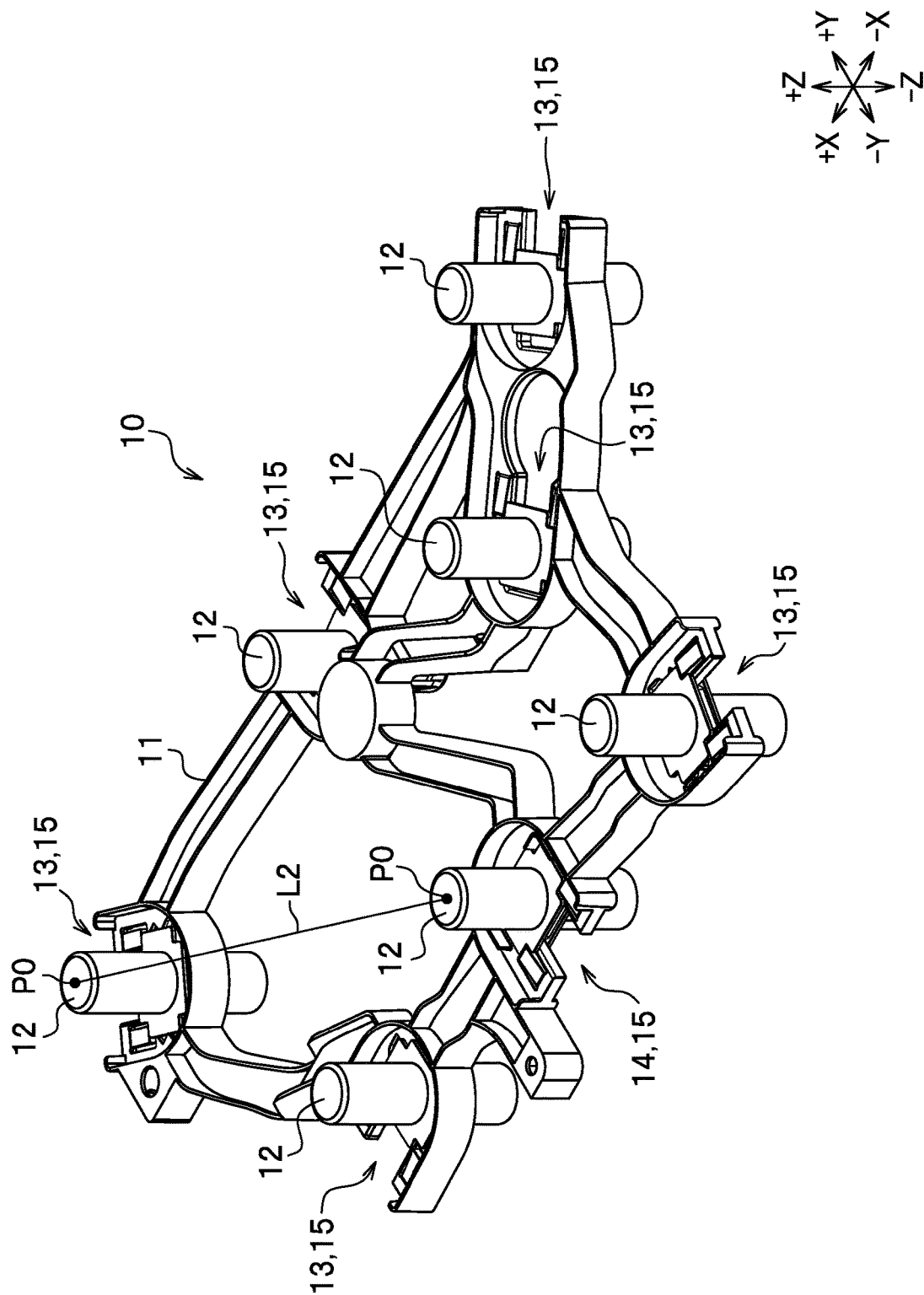
FIG. 3 is a schematic perspective view of the built-in component.

FIG. 3 is a schematic perspective view of the built-in component 10. The built-in component 10 includes a carrier 11, the pillar 12, the slidable fitting 13, and the fixed fitting 14. A distance between the pillar 12 for the slidable fitting 13 having the largest displacement in a X-Y coordinate plane, for example, and the pillar 12 for the fixed fitting 14 is a distance L2. Note that the distance between the pillars 12 is a distance between the centers P0 of the pillars 12 in a cylindrical shape. The distances between the pillars 12 are equal to each other in some cases and different from each other in some other cases in the drawing, but all the distances may be the same or different from one another.

The carrier 11 is a solid body having the fittings 15. The fitting 15 is for a fitted portion 30 (see FIG. 5) to be fitted thereinto. The carrier 11 being a solid body prevents the carrier 11 from being deformed during post-molding shrinkage of the fuel tank 1. In addition, the carrier 11 prevents the built-in component 10 from being bent when the built-in component 10 is arranged in the fuel tank 1, to allow for arranging the built-in component 10 inside the fuel tank 1 with high accuracy. The number of the fittings 15 is two or more, and may be equal to or greater than two but equal to or smaller than six, or equal to or greater than eight, even though the seven fittings 15 are shown in the drawing.

The carrier 11 is formed to have a frame shape extending in the X and Y directions in FIG. 3. The carrier 11 being formed to have a frame shape improves stiffness thereof. The carrier 11 is formed of a thermoplastic resin such as polyethylene and polystyrene. A description is given of a shape of the carrier 11, with reference to FIG. 4.

Figure 4:
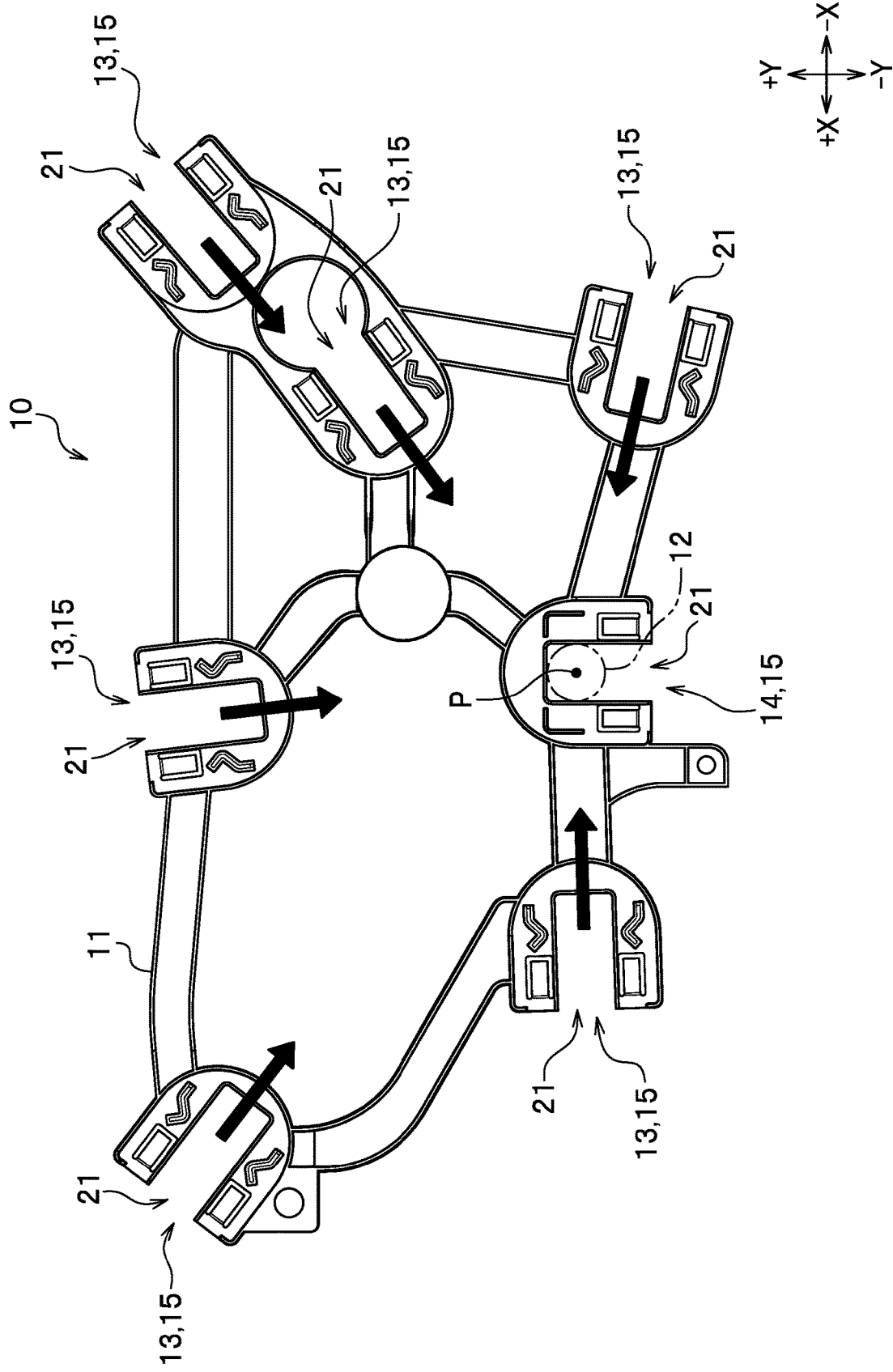
FIG. 4 is a top view of the built-in component, with pillars removed.

FIG. 4 is a top view of the built-in component 10, with the pillars 12 removed. The built-in component 10, more in particular the fitting 15, includes the slidable fitting 13 and the fixed fitting 14. The slidable fitting 13 has the fitted portion 30 (see FIGS. 3 and 5) of the pillar 12 (see FIGS. 3 and 5) slidably fitted into the fitting 15 (here, the slidable fitting 13) of the carrier 11, due to post-molding shrinkage of the fuel tank 1 (see FIG. 1). A sliding direction of the pillar 12 during post-molding shrinkage is defined herein as a slidable direction. The slidable directions are indicated by solid arrows in FIG. 4. The number of the slidable fittings 13 is at least one, and may be equal to or greater than two but equal to or smaller than five, or equal to or greater than seven, even though the six slidable fittings 13 are shown in the drawing.

The fixed fitting 14 is for the fitted portion 30 (see FIGS. 3 and 5) of the pillar 12 (see FIGS. 3 and 5) to be fitted into the fitting 15 (here, the fixed fitting 14) of the carrier 11, so as not to be slidable. The only one fixed fitting 14 is provided in the drawing. FIG. 4 shows the simplified pillar 12 fitted into the fixed fitting 14. A point P is the center of the axis of the pillar 12.

As indicated by the solid arrows in FIG. 4, the slidable direction(s) of at least one (one is acceptable) slidable fitting 13 is/are directed toward the fixed fitting 14. In the drawing, the respective slidable directions of the slidable fittings 13 run through the point P of the pillar 12 (see FIGS. 3 and 5) having the fitted portion 30 (see FIGS. 3 and 5) fitted into the fixed fitting 14. The slidable direction being directed toward the fixed fitting 14 allows for absorbing post-molding shrinkage.

At least one of two ends in the slidable direction of the slidable fitting 13 is open. An opening 21 is formed at said open end. Having either end being open allows the fitted portion 30 (see FIGS. 3 and 5) of the pillar 12 to be fitted into the slidable fitting 13 through the open end. In an example in the drawing, an opposite side of the slidable fitting 13 to the fixed fitting 14 is open and formed to have the opening 21. Forming in this manner prevents the fitted portion 30 from being separated through the opening 21, even when the fitted portion 30 slides in the direction indicated by a solid arrow in FIG. 4 due to post-molding shrinkage.

Figure 5:
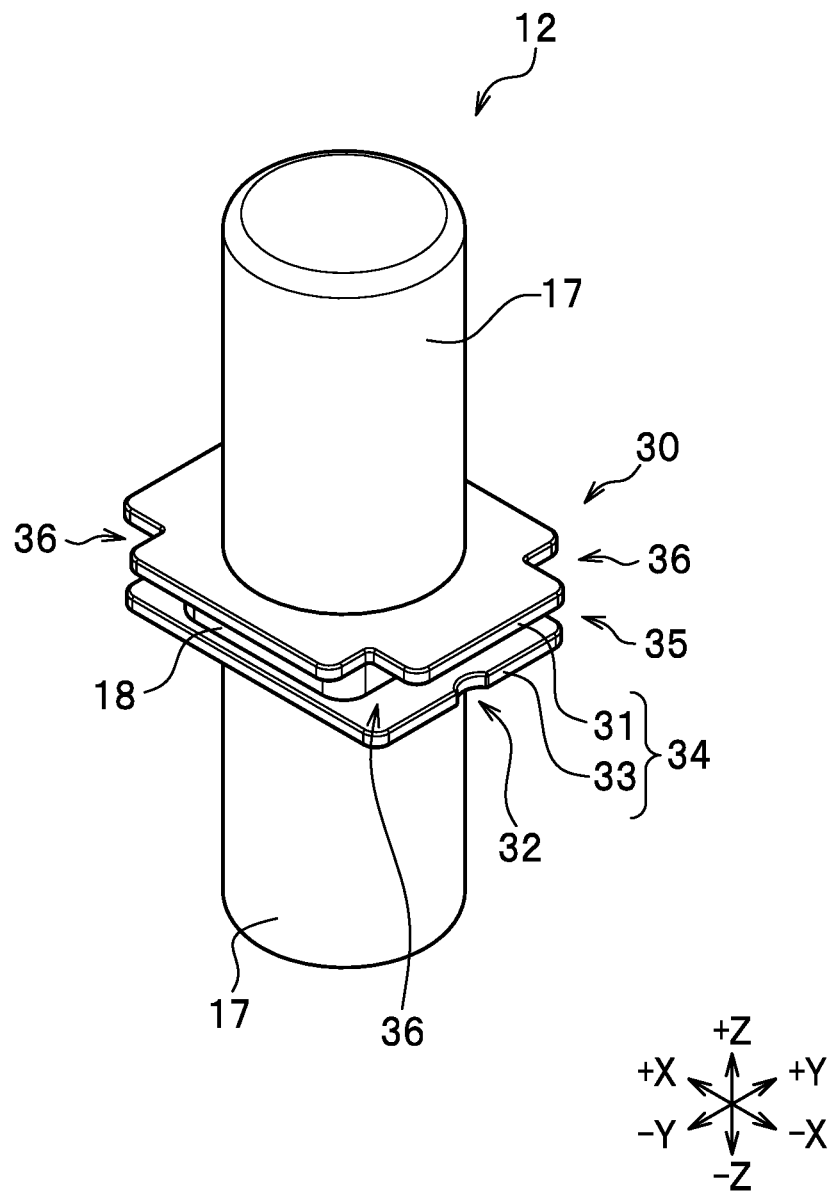
FIG. 5 is a perspective view of the pillar.

FIG. 5 is a perspective view of the pillar 12. In the drawings, the pillar 12 can be fitted into any one of the fittings 15, which are the slidable fittings 13 and the fixed fitting 14, but the pillar 12 to be fitted into the slidable fitting 13 may have a different shape from that to be fitted into the fixed fitting 14.

The pillar 12 includes a support portion 17 in a columnar shape and the fitted portion 30. The fitted portion 30 is a portion to be fitted into each of the fittings 15 of the carrier 11. The support portions 17 having the same shape as each other respectively extend in a +Z direction and a −Z direction from the fitted portion 30. The fitted portion 30 includes a flat plate 31 in a rectangular shape or substantially in a rectangular shape having cutoff portions 36 at four corners. In addition, the fitted portion 30 includes a flat plate 33 in a rectangular shape or substantially in a rectangular shape having notches 32 at two opposed sides of four sides (only the notch 32 at one of the two opposed sides is shown). Here, the wording "substantially in a rectangular shape" means almost in a rectangular shape when viewed from above, even though the shape may not be strictly rectangular. In particular, the corner is not square, for example, but rounded such as by chamfering.

The fitted portion 30 includes a held portion 35. The held portion 35 is a portion held by a flat plate group 34, inclusive of a pair of the opposed flat plates 31, 33, so as to fit with the fitting 15 (see FIG. 2). The held portion 35 includes a rectangular column 18, having the same dimensions as a dimension L3 in the X direction and a dimension L4 in the Z direction of the opening 21, between the pair of the flat plates 31, 33, as shown in FIG. 6.

Figure 6:
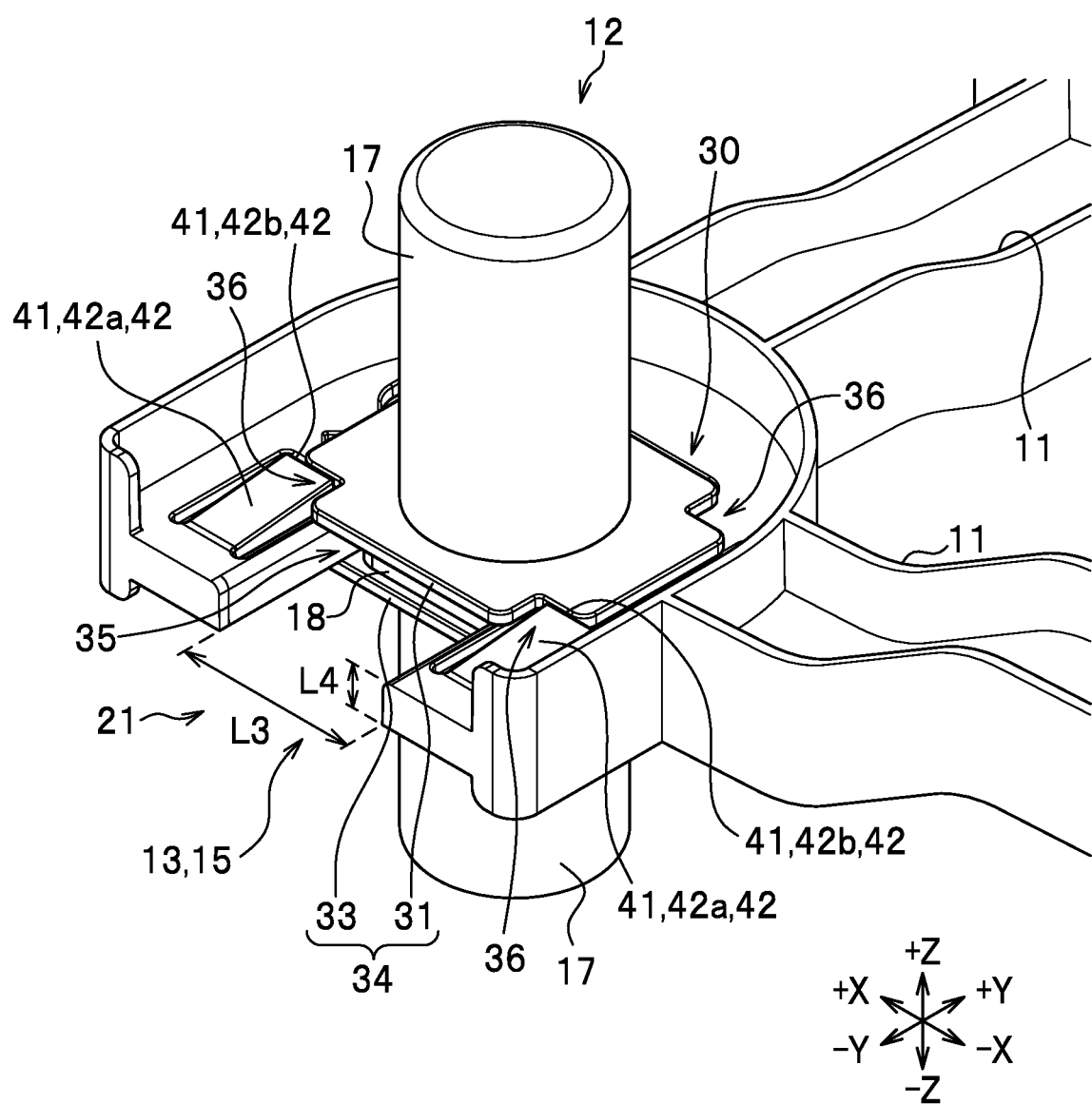
FIG. 6 is a perspective view of a fitted portion of the pillar fitted into a slidable fitting.

FIG. 6 is a perspective view of the fitted portion 30 of the pillar 12 fitted into the slidable fitting 13. The dimension (width) in the X direction of the opening 21 is L3. The distance in the X direction of the slidable fitting 13 (where the held portion 35 is held) is the dimension L3 all across in the Y direction of the slidable fitting 13. The distance (height) in the Z direction of the opening 21 is L4. A length in the Z direction of the slidable fitting 13 (where the held portion 35 is held) is also the dimension L4. Accordingly, inserting the fitted portion 30 into the slidable fitting 13 through the opening 21 results in the fitted portion 30 fitted with the slidable fitting 13.

The slidable fitting 13 includes a slide restriction member 41 to restrict the fitted portion 30 from sliding toward the open end where the opening 21 is formed. Having the slide restriction member 41 prevents the fitted portion 30 fitted with the sliding fitting 13 from separating through the opening 21.

The slide restriction member 41 is formed of a stop 42 having a slope 42a sloping upward from a near side (−Y direction), closer to the open end where the opening 21 is formed, toward a far side (+Y direction). Areas around three sides of the stop 42, except a front side, are cut in to make a back end of the stop 42 a free end so that the stop 42 is elastically deformable. Having the stop 42 allows the fitted portion 30 to be slid in the +Y direction, with the slope 42a pushed down in the −Z direction, when the fitted portion 30 is inserted through the opening 21. Once the fitted portion 30 is slid beyond a far end 42b of the stop 42, the slope 42a comes up in the +Z direction by a reaction force to engage the fitted portion 30 with the slidable fitting 13.

Figure 7:
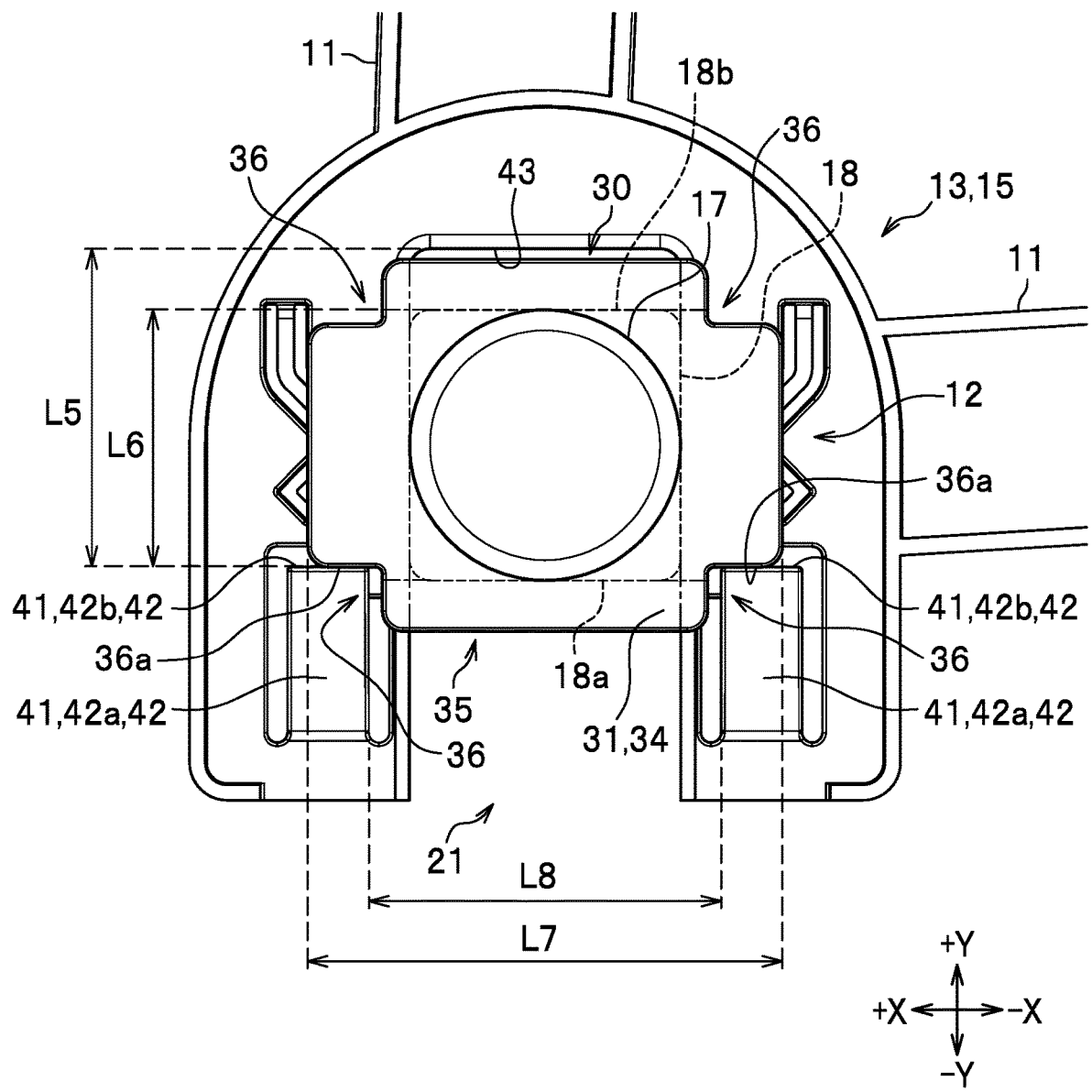
FIG. 7 is a top view of a scene in FIG. 6.

FIG. 7 is a top view of a scene in FIG. 6. FIG. 7 shows the scene in FIG. 6 when viewed from +Z direction toward the −Z direction. Engagement of the fitted portion 30 with the slidable fitting 13 is implemented by end surfaces 36a of the two cutoff portions 36, closer to the opening 21, contacting the ends 42b of the stops 42. When the cutoff portions 36 are engaged with the stops 42, positions in the Y direction of the ends 42b of the stops 42 are substantially aligned with a position in the Y direction of a front end 18a of the rectangular column 18.

In the slidable fitting 13, a distance between an end surface 43, on the far side (opposite side to the opening 21) as viewed from the opening 21, and the end 42b of the stop 42 is L5. In the pillar 12, a distance between an end surface 18b in the +Y direction of the rectangular column 18 and the end surface 36a in the −Y direction of the cutoff portion 36 is L6. The distance L5 is longer than the distance L6. This allows the pillar 12 to slide in a slidable range defined between the end surface 43 and the end 42b. A sliding amount in the slidable range, when the pillar 12 slides, is obtained by subtracting the distance L6 from the distance L5.

A length in the X direction of the flat plate 31 is L7. A distance between the slide restriction members 41 is L8. The length L7 is longer than the distance L8. This causes the flat plate 31 to be caught by the slide restriction members 41 when slid toward the opening 21, to keep the pillar 12 between the end surface 43 of the slidable fitting 13 and the end 42b of the stop 42.

Figure 8:
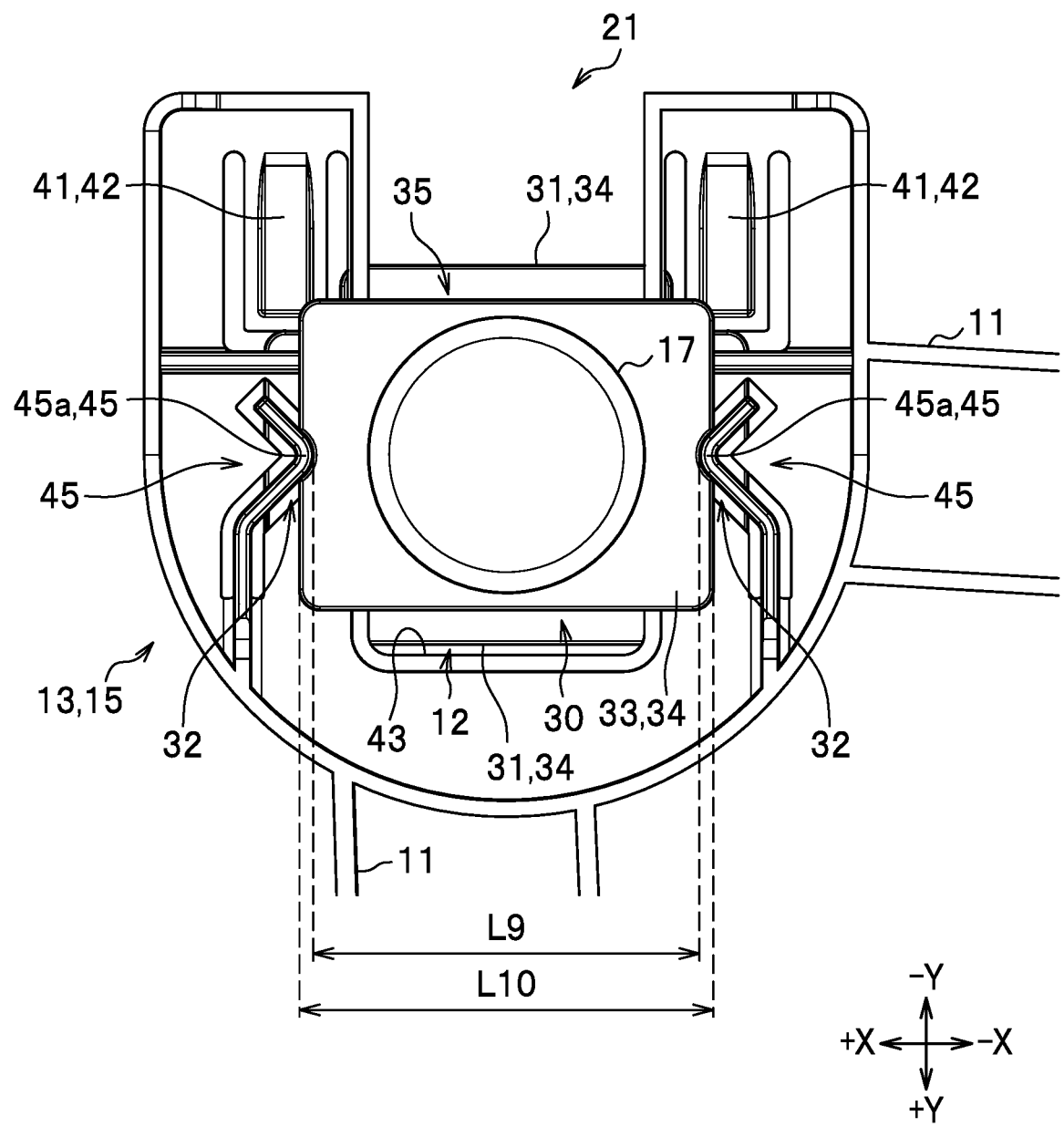
FIG. 8 is a bottom view of the scene in FIG. 6.

FIG. 8 is a bottom view of the scene in FIG. 6. FIG. 8 shows the scene in FIG. 6 when viewed from −Z direction toward the +Z direction. FIG. 8 shows the end surfaces 36a (see FIG. 7) of the two cutoff portions 36 (see FIG. 7), closer to the opening 21, contacting the ends 42b (see FIG. 7) of the stops 42.

As described above, the flat plate 33 has the notches 32 at two opposed sides of four sides. The slidable fitting 13 has engaging portions 45, at positions facing the notches 32, to engage the pillar 12 in a provisional condition of the fitted portion 30 having being fitted into the slidable fitting 13. Here, the provisional condition means a condition before post-molding shrinkage, in particular a condition of the parison having been blow molded with the built-in component 10 arranged, but not yet cooled. The slidable fitting 13 thus includes a mechanism of positioning in the slidable direction (Y direction), composed of the engaging portions 45. The engaging portion 45 is a leaf spring, for example, configured to have a bent portion 45a thereof fitted into the notch 32 when no stress is working. Having the engaging portions 45 allows for engaging the pillar 12, in the provisional condition of the fitted portion 30 having been fitted into the slidable fitting 13. This allows the built-in component 10 to be arranged in the fuel tank 1, with the pillars 12 engaged.

The engaging portions 45 are provided in pairs so as to have the pillar 12 in between. A distance in the X direction between a pair of the engaging portions 45 is L9. Note that a distance in the X direction between the notches 32 formed on the two opposite sides is also the distance L9. In addition, a length in the X direction of the flat plate 33 is L10. The length L10 is longer than the distance L9. This allows the engaging portions 45 to engage the pillar 12 having the flat plate 33.

Figure 9:
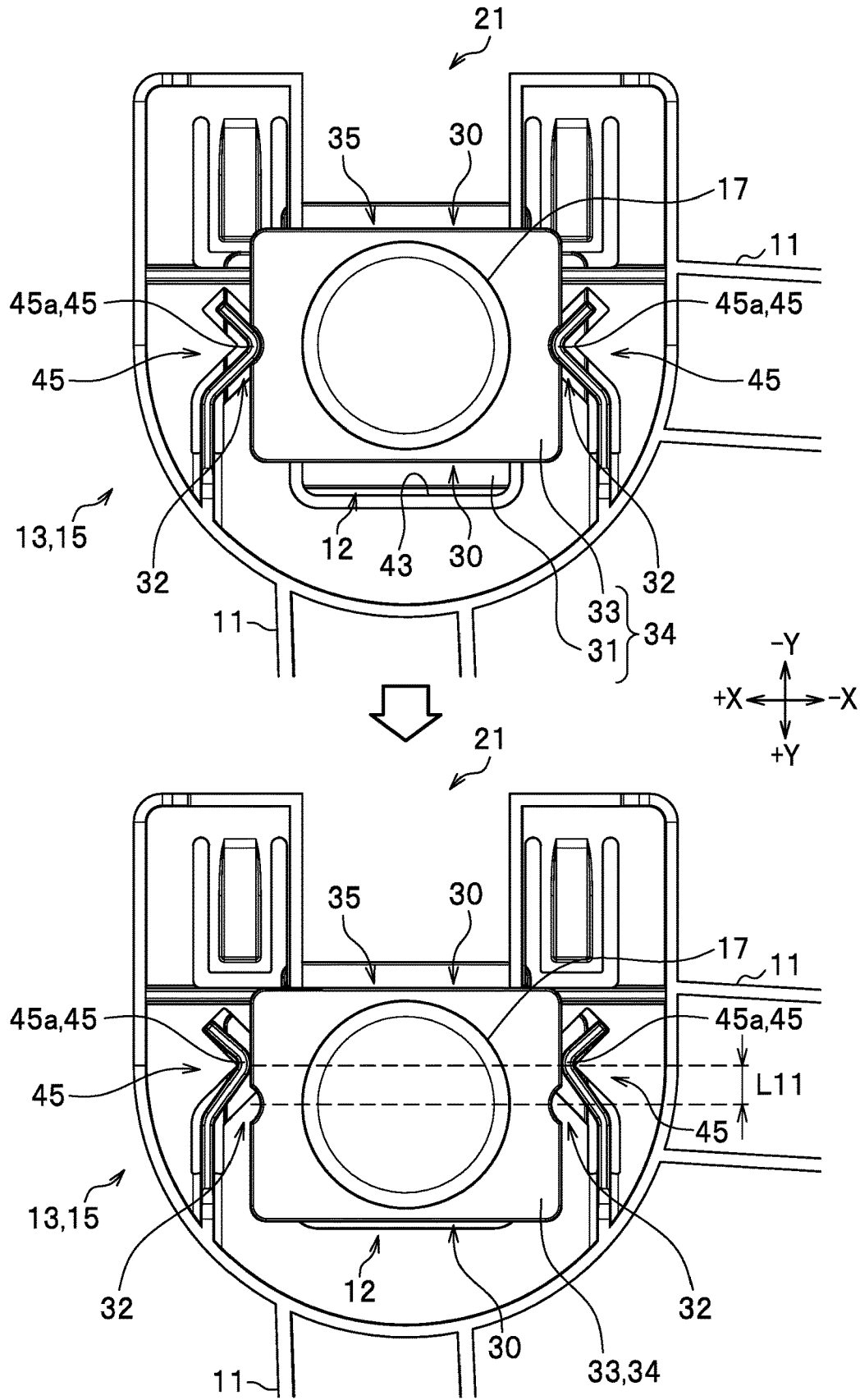
FIG. 9 illustrates the pillar moving during post-molding shrinkage.

FIG. 9 illustrates the pillar 12 moving during post-molding shrinkage. As shown in an upper drawing (the same scene as in FIG. 8) in FIG. 9, the notchs 32 are engaged in the provisional condition by the engaging portions 45. At this time, the distance in the X direction between the engaging portions 45 is equal to the distance in the X direction between the notches 32, and is the distance L9 (see FIG. 8).

During post-molding shrinkage of the fuel tank 1, with the pillars 12 engaged by the engaging portions 45, the pillars 12 are moved, as described above with reference to FIG. 2, with the positions (in the X-Y coordinate) of the fittings 15 unchanged, that is, with the position of the carrier 11 unchanged. As a result, the pillars 12 have the engagement by the engaging portions 45 released and are slid in the respective slidable ranges toward the fixed fitting 14. The pillars 12 having the engagement released and being slid toward the fixed fitting 14, during post-molding shrinkage, allows for absorbing post-molding shrinkage as homologous deformation by the built-in component 10 having the pillars 12 engaged therewith, as shown in FIG. 2.

As shown in a lower drawing in FIG. 9, the pillar 12 is slid by a sliding amount L11. The sliding amount L11 of the pillar 12 can be determined from the distance between the slidable fitting 13 and the fixed fitting 14, and a rate of shrinkage of a material of the parison (a member of the fuel tank 1 to have post-molding shrinkage) to contain the built-in component 10. The distance between the slidable fitting 13 and the fixed fitting 14 is determined for each pillar 12, for which the sliding amount L11 is to be determined, and in a case of the example in FIG. 3, the sliding amount of the pillar 12 for the slidable fitting 13, which has the largest displacement in the X-Y plane, is determined based on the distance L2, as a distance in the X-Y plane from the pillar 12 for the fixed fitting 14. The rate of shrinkage of the material of the parison to contain the built-in component 10 may be selected from known values depending on the material, or may be determined by experiment or the like.

Once the rate of shrinkage from before and after the post-molding shrinkage is determined, the distance is multiplied by the rate of shrinkage to calculate the magnitude of the post-molding shrinkage, that is, the sliding amount L11 of the pillar 12. The pillar 12 is slid in the slidable range with the distance L5 (FIG. 7) in the Y direction, defined between the end surface 43 of the slidable fitting 13 and the end 42b of the stop 42. In addition, the distance L6 (see FIG. 7) is the distance between the end surface 18b in the +Y direction of the rectangular column 18 and the end surface 36a in the −Y direction of the cutoff portion 36, as described above. Accordingly, as far as a value obtained by subtracting the distance L5 from the distance L6 is greater than or equal to the sliding amount L11, restricting the pillar 12 from moving by the slidable fitting 13 is controllable during post-molding shrinkage.

A length (length L5) in the slidable direction of the slidable range is preferably a value determined based on a distance between the slidable fitting 13 and the fixed fitting 14 (distance L2 in the example in FIG. 3) and a rate of shrinkage of the material of the parison to contain the built-in component. This allows for estimating the sliding amount during post-molding shrinkage to provide a sufficient slidable range.

Figure 10:
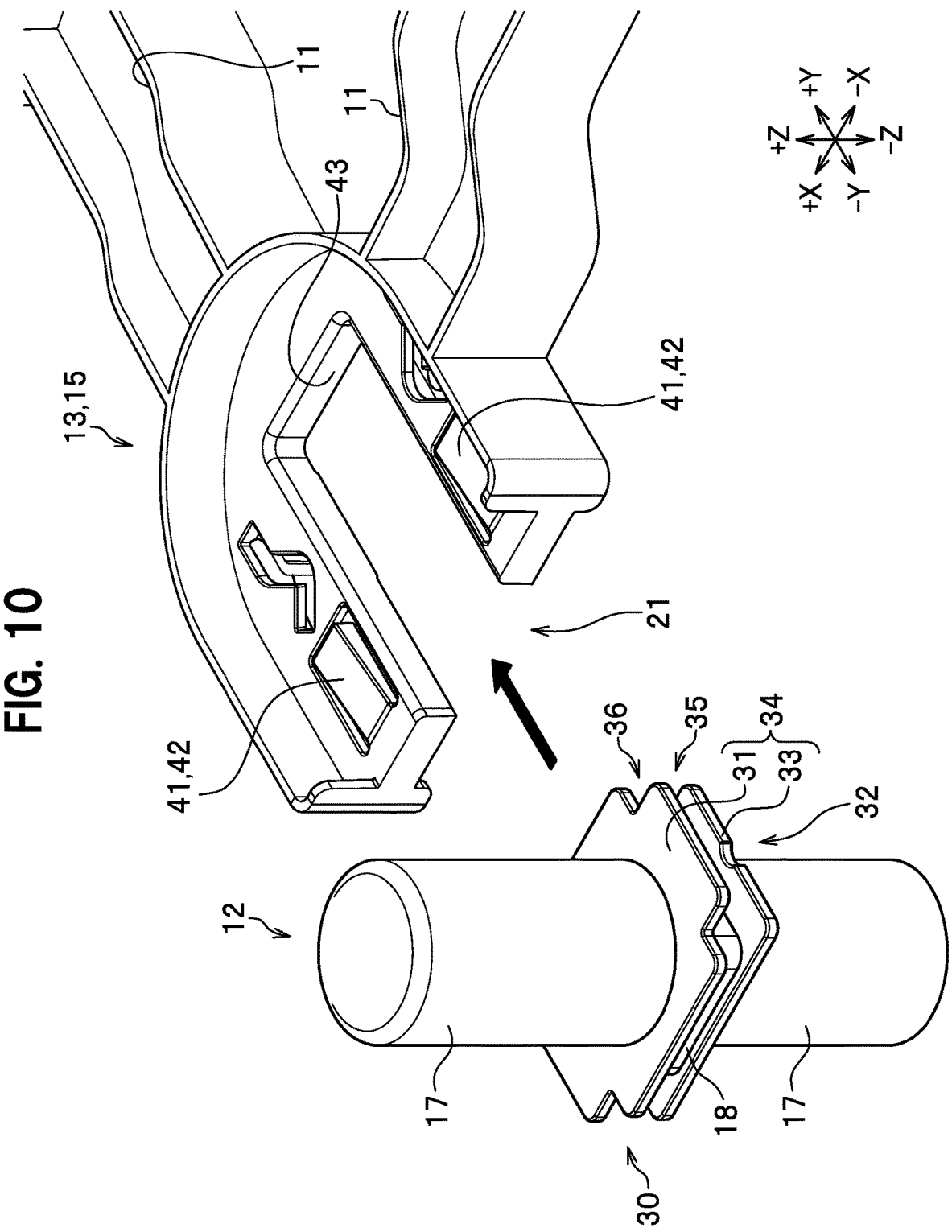
FIG. 10 illustrates the pillar being fitted into the slidable fitting.

FIG. 10 illustrates the pillar 12 being fitted into the slidable fitting 13. Inserting the pillar 12 through the opening 21, as indicated by a solid arrow, accomplishes fitting the pillar 12 into the slidable fitting 13. The pillar 12 is inserted through the opening 21 such that a direction of the slide restriction members 41 being arranged (X direction) is aligned with a longitudinal direction of the flat plate 31 having the length L5. This allows the pillar 12 to be fitted into the slidable fitting 13, as shown in FIGS. 6 to 8.

If the pillar 12 is fitted into the slidable fitting 13 with an orientation different from that shown in FIG. 10, when being fitted, the pillar 12 results in incorrect fitting (fitting error). The built-in component 10 can detect such incorrect fitting.

Figure 11:
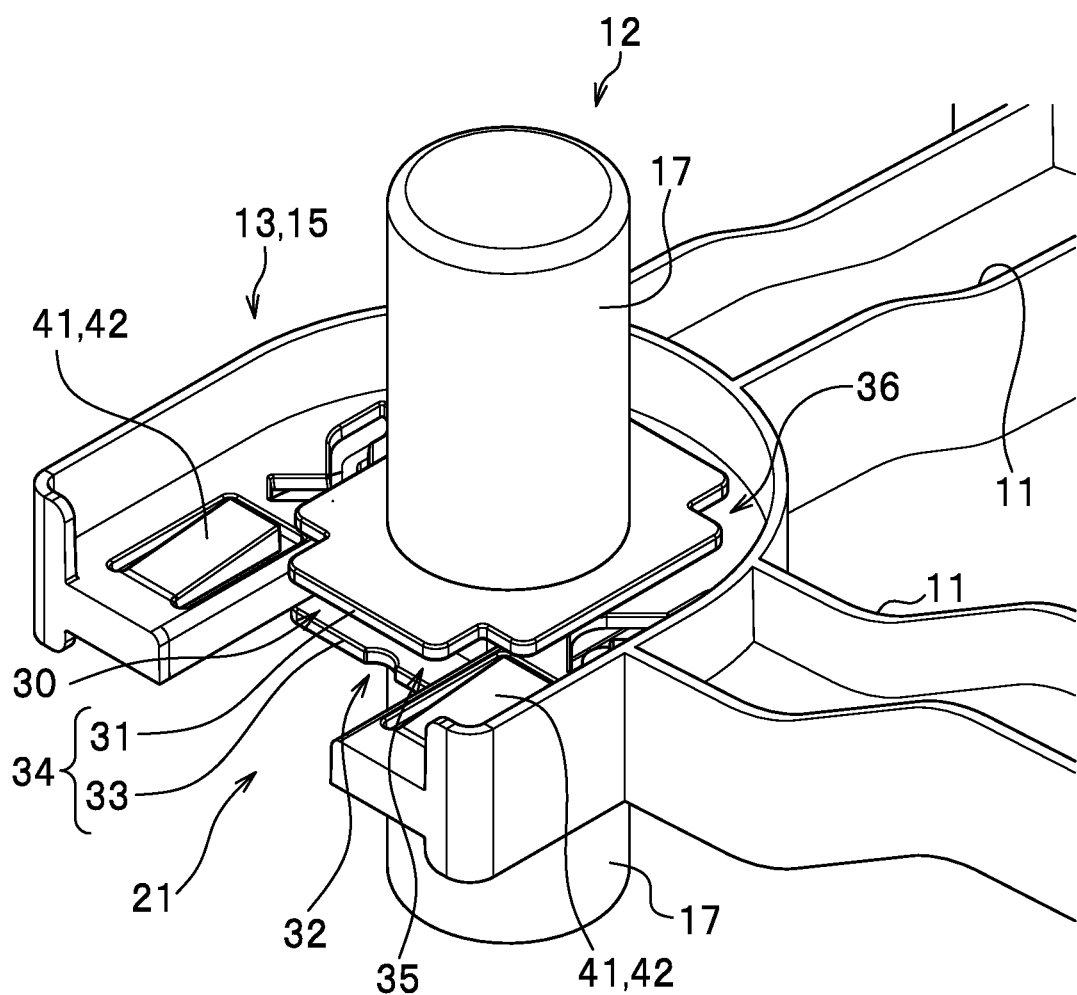
FIG. 11 illustrates the pillar resulted in incorrect fitting in FIG. 10.

FIG. 11 illustrates the pillar 12 resulted in incorrect fitting at a time of the fitting in FIG. 10. FIG. 11 shows a case where the pillar 12 has been inserted through the opening 21, with the pillar 12 rotated in the X-Y plane by 90 degrees from the orientation indicated in FIG. 10.

Figure 12:
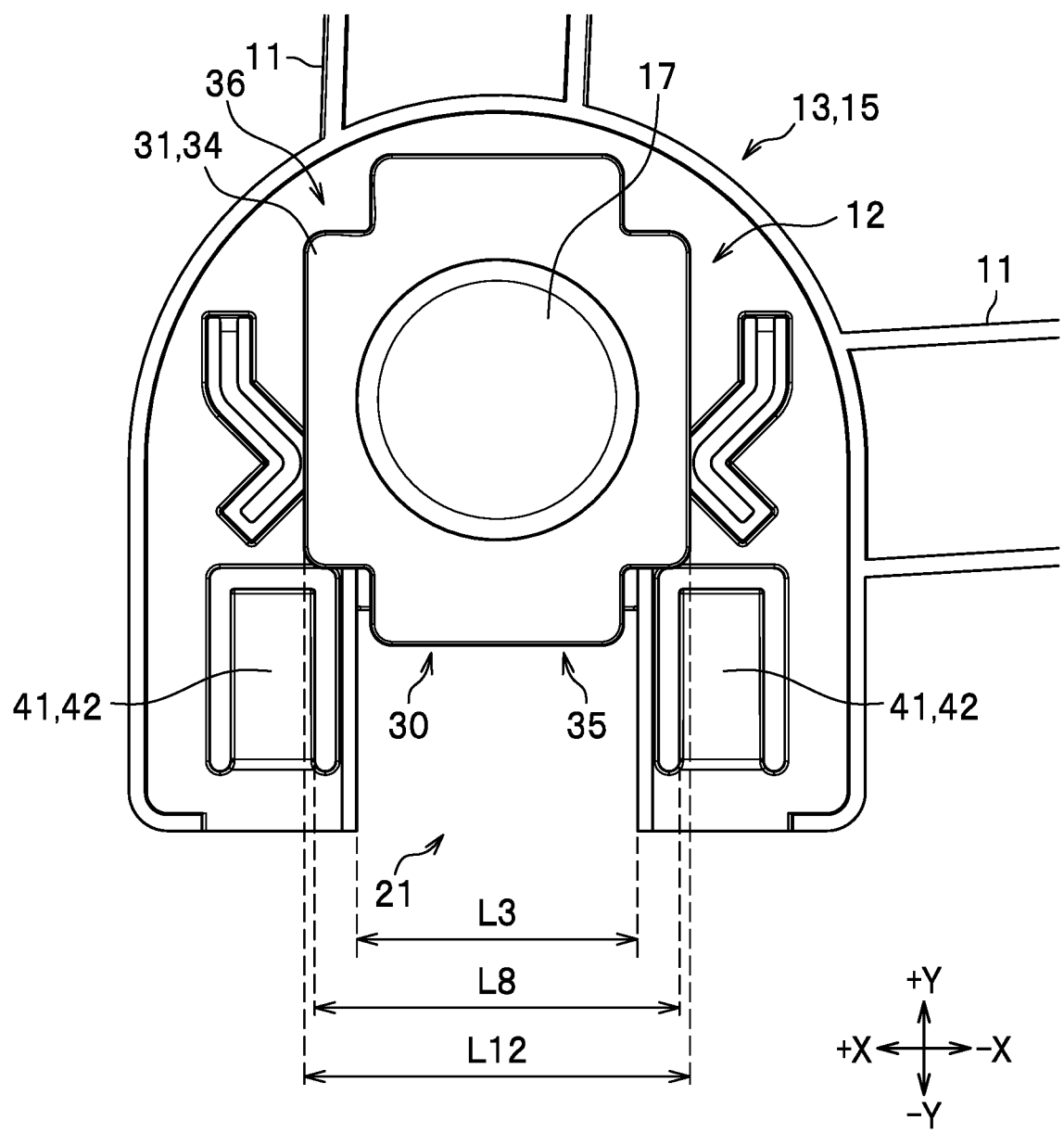
FIG. 12 is a top view of a scene in FIG. 11.

FIG. 12 is a top view of a scene in FIG. 11. In the example in the drawing, a length in a transverse direction of the flat plate 31 is L12. The length L12 is longer than the distance L3 in the X direction of the opening 21. This allows the fitted portion 30 to be fitted into the slidable fitting 13, even when the pillar 12 is inserted through the opening 21, with the pillar 12 rotated in the X-Y plane by 90 degrees from the orientation indicated in FIG. 10. In addition, the length L2 is longer than the distance L8 between the slide restriction members 41. This allows sliding of the flat plate 31 toward the opening 21 to be restricted by the slide restriction members 41, even when the pillar 12 is inserted through the opening 21, with the pillar 12 rotated in the X-Y plane by 90 degrees from the orientation indicated in FIG. 10.

Figure 13:
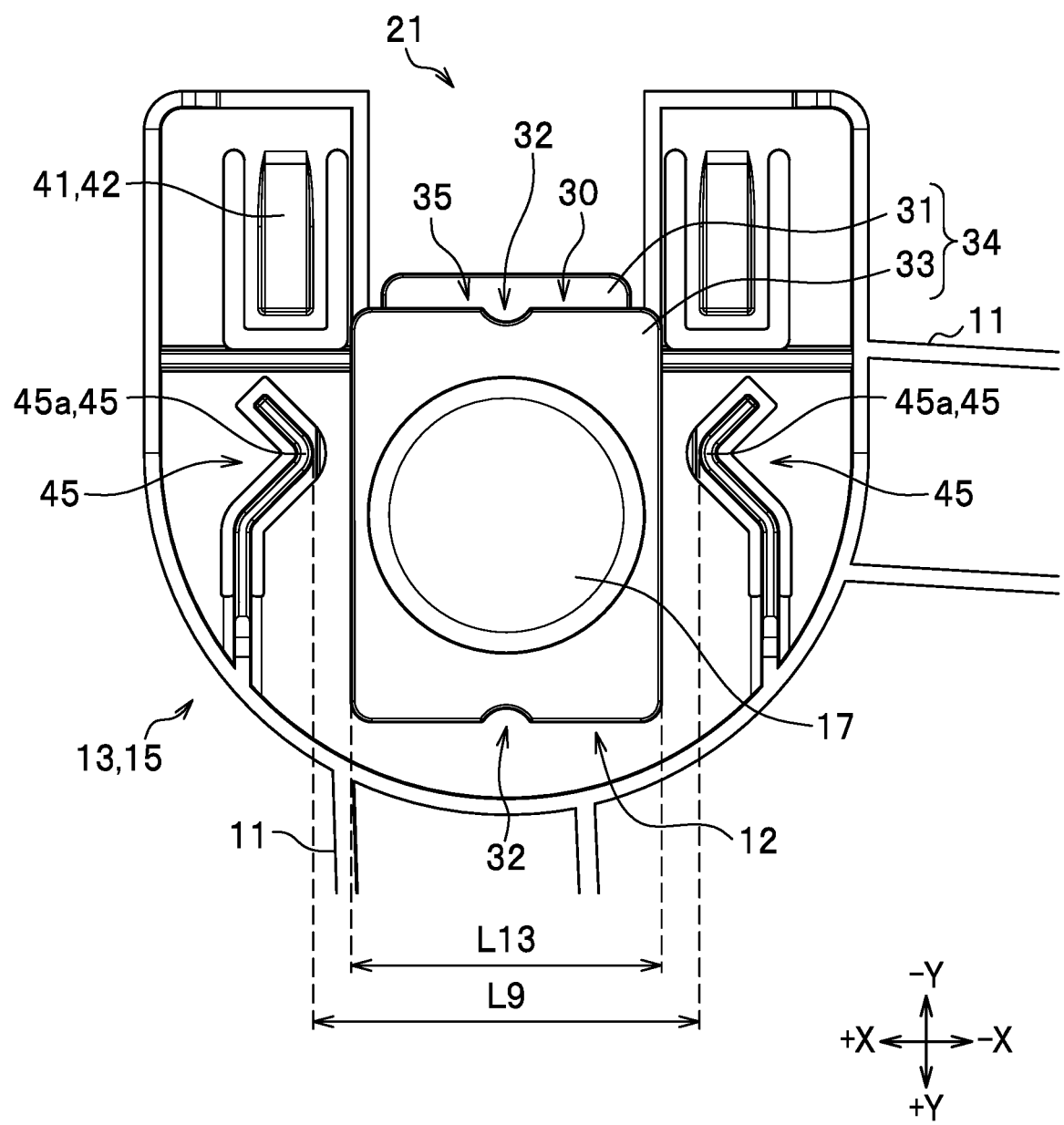
FIG. 13 is a bottom view of the scene in FIG. 11.

FIG. 13 is a bottom view of the scene in FIG. 11. As described above, the pillar 12 is inserted through the opening 21, with the pillar 12 rotated by 90 degrees from the orientation indicated in FIG. 10. A length in a transverse direction of the flat plate 33 is L13. The length L13 is shorter than the distance L9 in the X direction of a pair of the stops 45. This causes the flat plate 33 to fail to contact the pair of the stops 45. The notches 32 of the flat plate 33 fail to contact the engaging portions 45 either. This causes the engaging portions 45 to fail to engage the flat plate 33 of the pillar 12, so that no positioning is made. As a result, the pillar 12 is wobbly to allow one to detect incorrect fitting of the pillar 12 in the slidable fitting 13.

Figure 14:
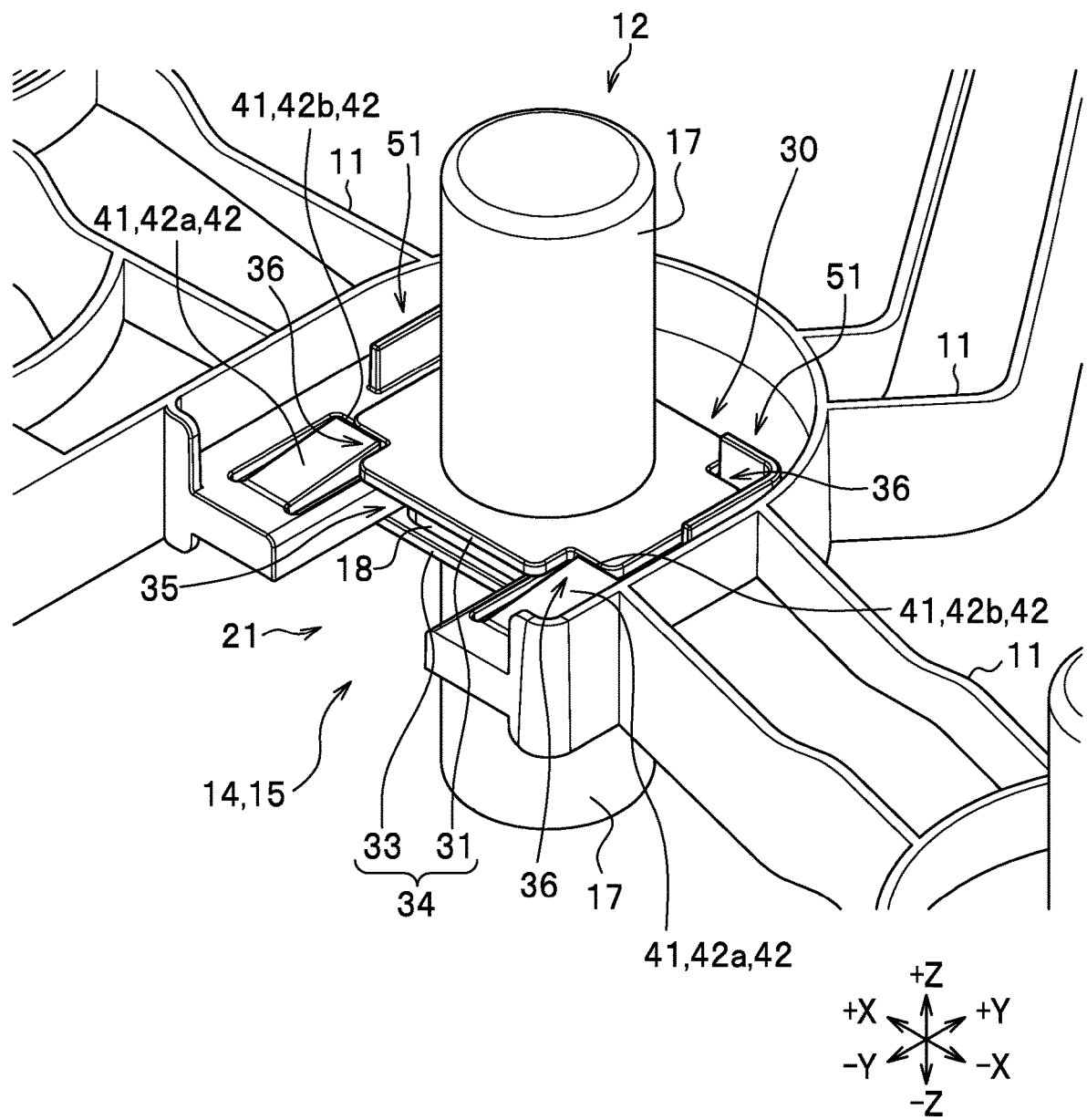
FIG. 14 is a perspective view of a fixed fitting.

FIG. 14 is a perspective view of the fixed fitting 14. The fixed fitting 14 includes the slide restriction members 41 to restrict the held portion 35 of the pillar 12 from sliding, as with the slidable fitting 13. However, the fixed fitting 14 includes a rib 51, which is not included in the slidable fitting 13. The held portion 35 of the pillar 12 is placed between the rib 51 and the slide restriction member 41.

Figure 15:
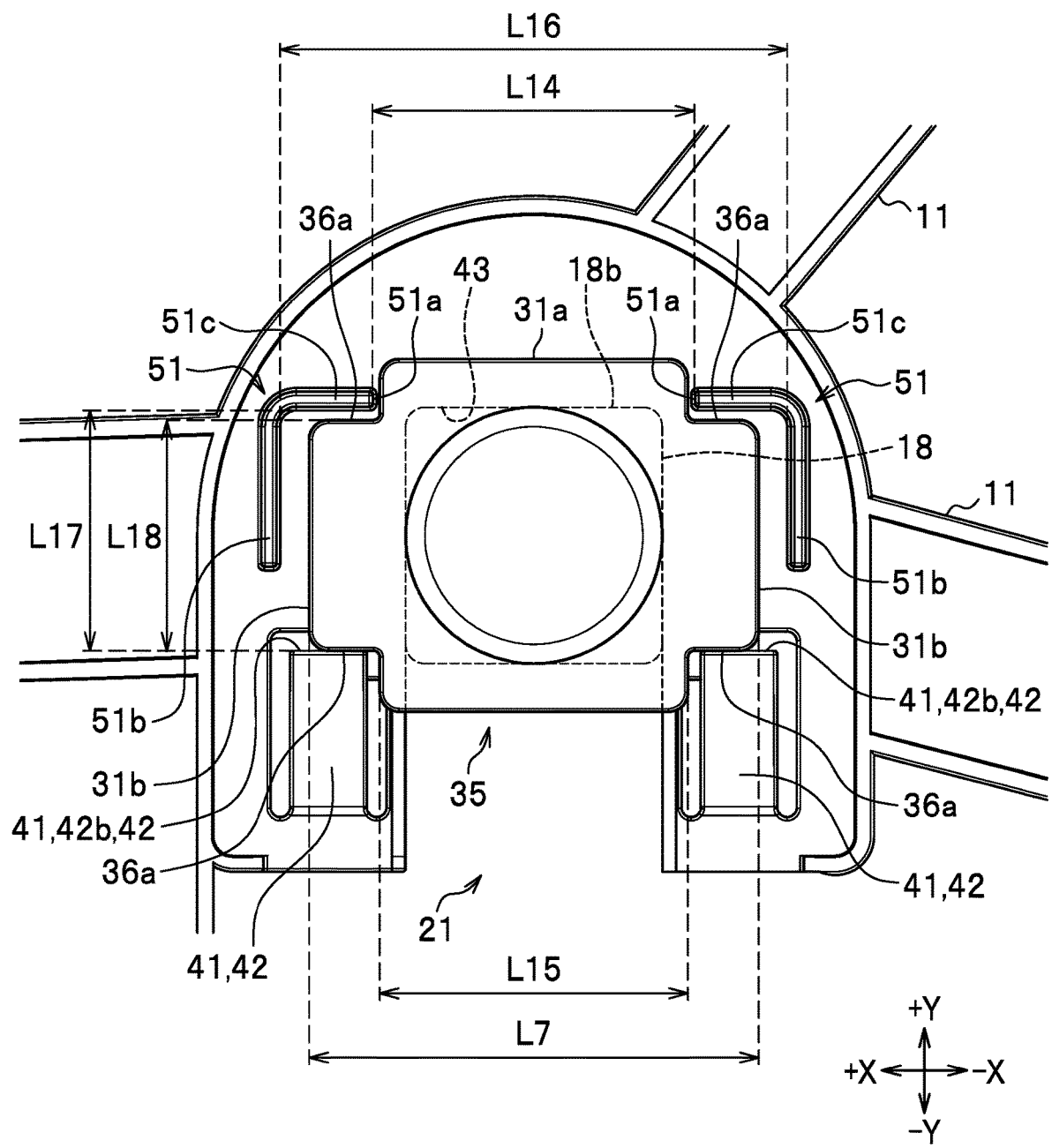
FIG. 15 is a top view of a scene in FIG. 14.

FIG. 15 is a top view of the scene in FIG. 14. A pair of the ribs 51 is provided symmetrically so as to hold the flat plate 31 in between. The rib 51 can have any shape, as far as being capable of restricting a position in the Y direction of the flat plate 31, and may have an L-shape, for example, to extend in two directions of an opening direction (Y direction) of the opening 21 and a direction in parallel to the opening 21 (X direction). In the example in the drawing, the rib 51 includes a rib 51c extending in the X direction, and a rib 51b extending in the Y direction. Among these, the rib 51c positions the pillar 12 in the X direction, when the pillar 12 is fixed. The rib 51b guides the pillar 12 being inserted in the +Y direction, when the pillar 12 is inserted through the opening 21, as described in detail below with reference to FIG. 16.

A distance between an end 51a in the −X direction of one of the ribs 51 and the end 51a in the +X direction of the other of the ribs 51 is L14. The distance L14 is slightly longer than a length L15 of an end surface 31a of an end surface extending in the X direction of the flat plate 31, with end surfaces of the cutoff portions 36 excluded. A part of the flat plate 31 is thus placed between the ends 51a. This positions the pillar 12, having the flat plate 31, in the X direction.

A distance between the ribs 51b is L16. The distance L16 is longer than the length L7 as the length in the X direction of the flat plate 31. The flat plate 31 is thus placed between the ribs 51b. The ribs 51b, extending in the Y direction, of the ribs 51 respectively face end surfaces 31b of the flat plate 31, extending in the same direction (Y direction) as the slidable direction. In addition, the ribs 51c respectively face the end surfaces 36a in the Y direction of the two cutoff portions 36 on the far side from the opening 21. The ribs 51c are arranged on the opposite side of the said end surfaces 36a to the opening 21.

The pillar 12 having the flat plate 31 is fixed by the fixed fitting 14, which is not the case with the slidable fitting 13. The fixed fitting 14 is thus formed with the opening 21 at one end in the slidable direction, which is open, and the end surface 43 (closed end surface) at the other end in the slidable direction. The fixed fitting 14 includes the slide restriction members 41 to restrict the held portion 35 so as to slide between the opening 21 and the end surface 43. The held portion 35 is engaged by the slide restriction members 41 and the end surface 43. In the example shown in the drawing, a position in the Y direction of the end surface 18b of the rectangular column 18 of the held portion 35 is substantially the same as a position in the Y direction of the end surface 43 of the fixed fitting 14. That is, the end surface 18b contacts the end surface 43. In addition, positions in the Y direction of the end surfaces 36a of the two cutoff portions 36, closer to the opening 21, are substantially the same as positions in the Y direction of the ends 42b of the stops 42 of the slide restriction members 41. That is, the ends 42b contact the end surfaces 36a. Configuration in this manner allows the pillar 12 to be fixed in the fixed fitting 14.

A distance between the rib 51c and the end 42b of the slide restriction member 41 is L17. Additionally, a length of the end surface 31b of an end surface extending in the Y direction of the flat plate 31, with end surfaces of the cutoff portions 36 excluded, is L18. The length L17 is longer than the length L18. The flat plate 31 is thus placed between the ends 42b of the slide restriction members 41 and the ribs 51c.

Figure 16:
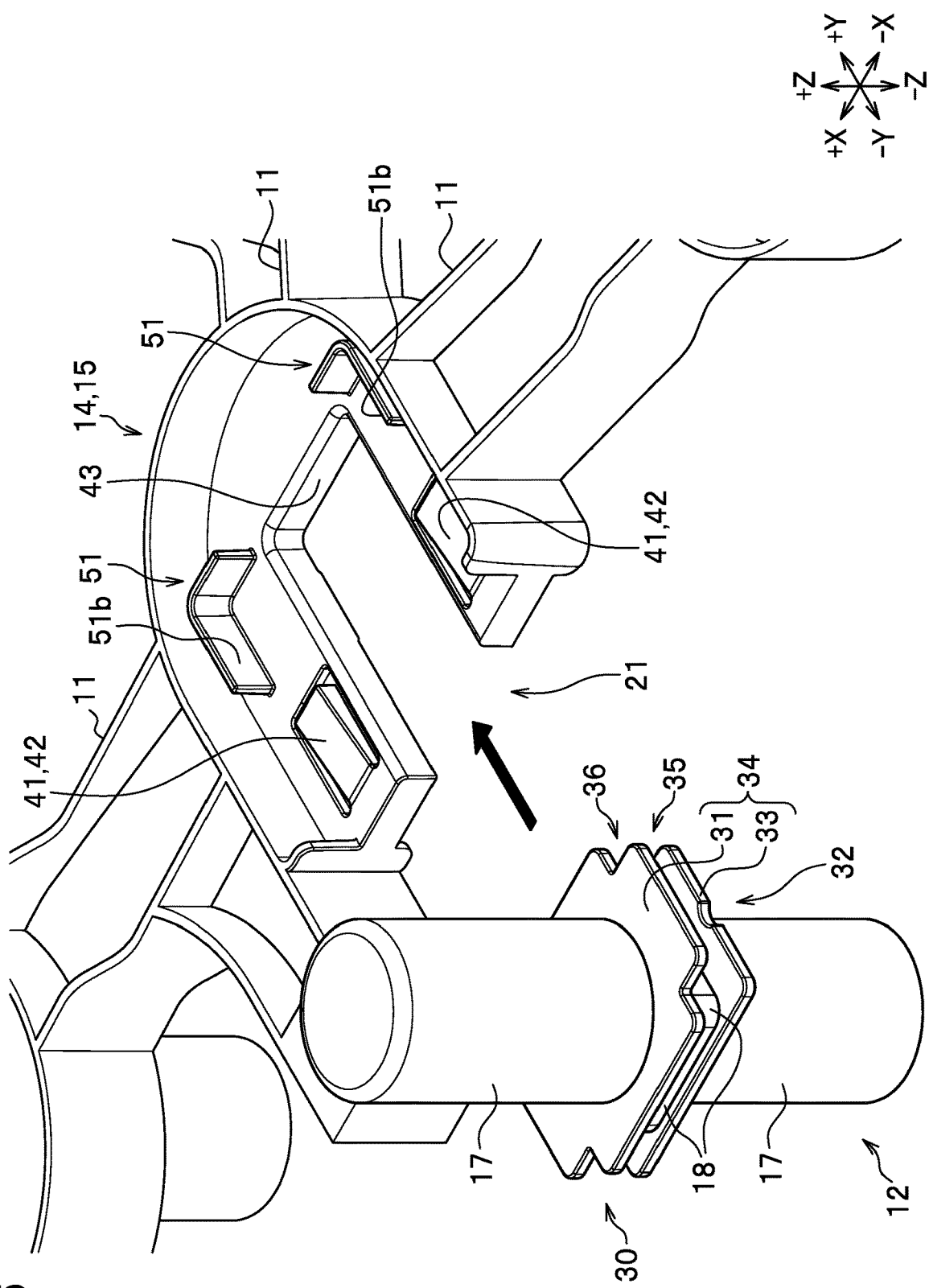
FIG. 16 illustrates the pillar being fitted into the fixed fitting.

FIG. 16 illustrates the pillar 12 being fitted into the fixed fitting 14. Inserting the pillar 12 through the opening 21, as indicated by a solid arrow, accomplishes fitting the pillar 12 into the fixed fitting 14. The pillar 12 is inserted through the opening 21 such that a direction of the slide restriction members 41 being arranged (X direction) is aligned with a longitudinal direction of the flat plate 31 having the length L5. At this time, insertion of the pillar 12 in the +Y direction is guided by the ribs 51*b*. This causes the pillar 12 to be fitted into the fixed fitting 14, as shown in FIGS. 14 and 15.

If the pillar 12 is fitted into the fixed fitting 14 with an orientation different from that shown in FIG. 16, when being fitted, the pillar 12 results in incorrect fitting (fitting error). The built-in component 10 can detect such incorrect fitting.

Figure 17:
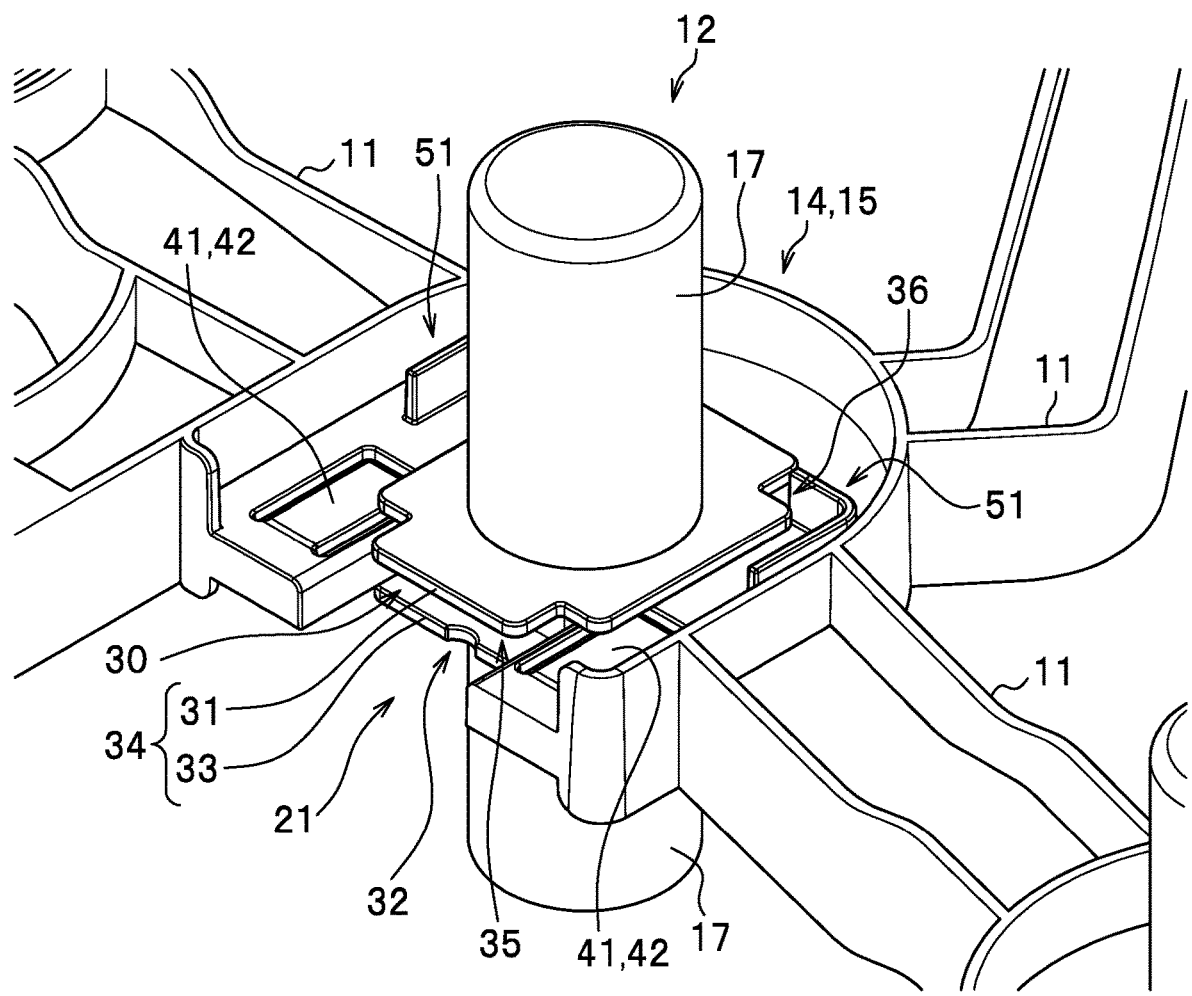
FIG. 17 illustrates the pillar resulted in incorrect fitting in FIG. 16.

FIG. 17 illustrates the pillar 12 has resulted in incorrect fitting in FIG. 16. In the example in FIG. 17, the pillar 12 has been inserted through the opening 21, with the pillar 12 rotated by 90 degrees in the X-Y plane from the orientation in FIG. 16.

Figure 18:
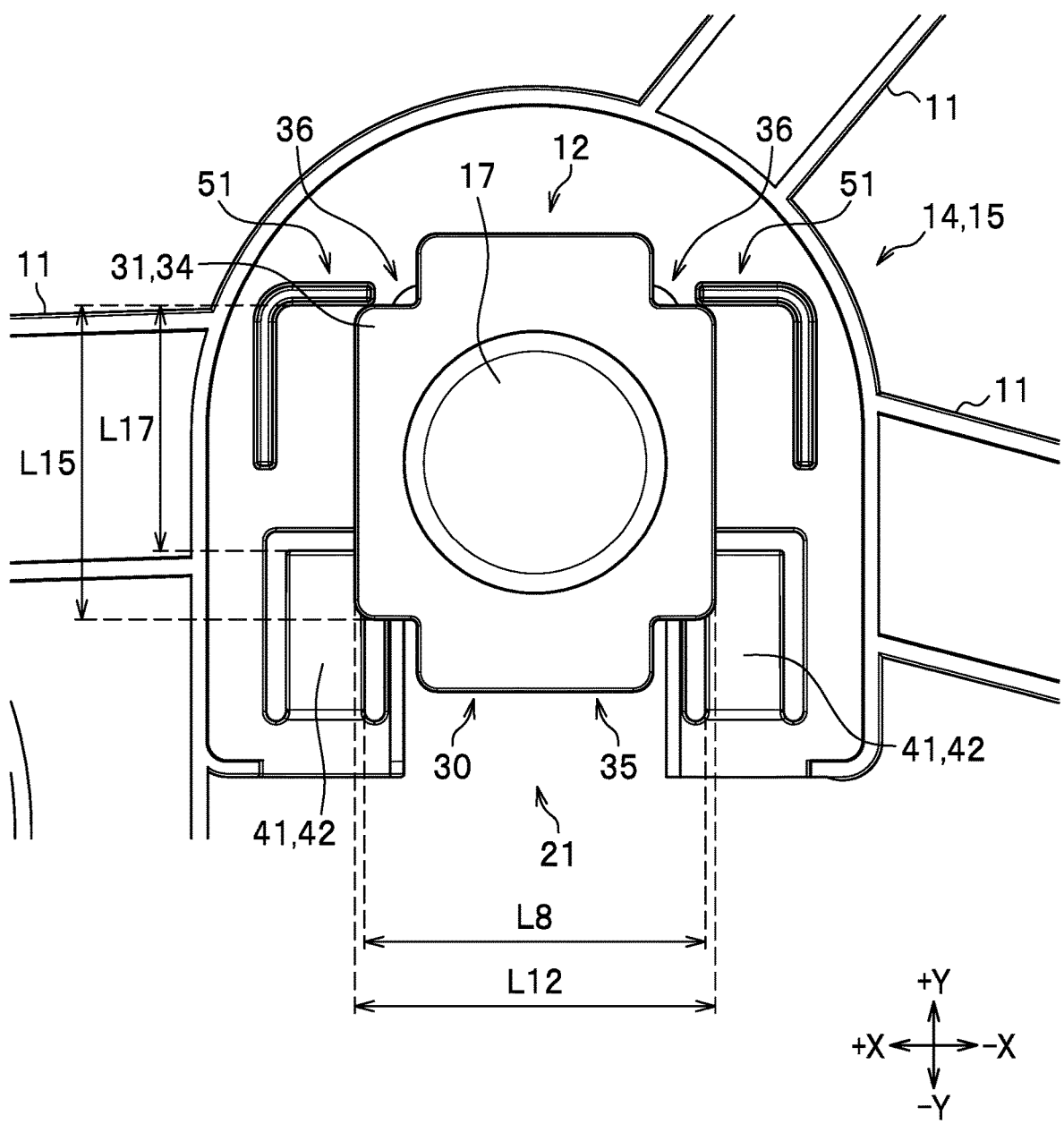
FIG. 18 is a top view of a scene in FIG. 17.

FIG. 18 is a top view of the scene in FIG. 17. The distance between the slide restriction members 41 is L8. Additionally, the length in the transverse direction of the flat plate 31 is L12. The length L12 is longer than the distance L8. This causes the flat plate 31 to be placed on the slide restriction members 41 when the pillar 12 has been inserted through the opening 21.

In addition, the length in the Y direction of the end surface 31*a* of the end surface extending in the Y direction of the flat plate 31, with the end surfaces of the cutoff portions 36 excluded, is L15. Additionally, the distance between the rib 51*c* and the end 42*b* of the slide restriction member 41 is L17. The length L15 is longer than the distance L17. Accordingly, the flat plate 31 does not fit between the ribs 51*c* and the ends 42*b* of the slide restriction members 41, even when the flat plate 31 is inserted through the opening 21 to the far end, and hangs over the slide restriction members 41. As a result, the pillar 12 is not fixed and comes off by a weak force, to allow for detecting incorrect fitting of the pillar 12 in the fixed fitting 14.

As described above, the built-in component 10 provided in the fuel tank 1 has the fitted portion 30 of the pillar 12 slidably fitted into the fitting 15 of the carrier 11. The carrier 11 itself is thus prevented from becoming non-rigid, to allow the built-in component 10 to be arranged in the fuel tank 1 with high accuracy. This allows for suitably absorbing post-molding shrinkage of the fuel tank 1.

In addition, the slidable directions of the slidable fittings 13 are directed toward the fixed fitting 14. The fuel tank 1 is thus capable of absorbing complex displacements due to post-molding shrinkage thereof more than a conventional fuel tank. This prevents the pillars 12 from being separated from the fuel tank 1 due to post-molding shrinkage, to improve reliability of the fuel tank 1.

LEGEND FOR REFERENCE NUMERALS

1: fuel tank, 10: built-in component, 11: carrier, 12: pillar, 13: slidable fitting, 14: fixed fitting, 15: fitting, 30: fitted portion, 32: notch, 33: flat plate, 35: held portion, 36: cutoff portion, 41: slide restriction member, 42: stop, 42*a*: slope, 42*b*: end, 43: end surface (closed end surface), and 45: engaging portion.

The invention claimed is:

1. A fuel tank having a built-in component, the built-in component comprising:
   a carrier as a rigid body having fittings; and
   pillars having fitted portions respectively fitted into the fittings of the carrier and each pillar having upper and lower surfaces configured to, respectively, contact inner walls of the fuel tank,
   wherein the fittings include:
      at least one slidable fitting having one of the fitted portions of the pillars slidably fitted thereinto due to post-molding shrinkage of the fuel tank, and
      a fixed fitting having another one of the fitted portions of the pillars fitted thereinto so as not to be slidable,
   wherein the at least one slidable fitting is slidable by the pillar fitted thereinto toward the fixed fitting, in a direction parallel with the inner walls, due to post-molding shrinkage of the fuel tank.

2. The fuel tank according to claim 1, wherein
   at least one of two ends in the slidable direction of the slidable fitting is open.

3. The fuel tank according to claim 2, wherein
   the slidable fitting includes a slide restriction member to restrict the fitted portion from sliding toward said open end.

4. The fuel tank according to claim 3, wherein
   the slide restriction member is formed of a stop having a slope sloping upward from a near side in the slidable direction, closer to the open end, toward a far side in the slidable direction.

5. The fuel tank according to claim 1, wherein
   the slidable fitting has engaging portions to engage one of the pillars in a provisional condition of the fitted portion having been fitted into the slidable fitting.

6. The fuel tank according to claim 5, wherein
   one of the pillars, engaged by the engaging portions, has engagement by the engaging portions released and is slid in a slidable range toward the fixed fitting, during post-molding shrinkage of the fuel tank.

7. The fuel tank according to claim 6, wherein
   a length in the slidable direction of the slidable range is a value determined based on a distance between the slidable fitting and the fixed fitting and a rate of shrinkage of a material of a parison to contain the built-in component.

8. The fuel tank according to claim 1, wherein
   the fitted portion includes a held portion to be held by a flat plate group, inclusive of a pair of flat plates, and to be fitted with the fixed fitting,
   the fixed fitting is formed with an opening at one end in the slidable direction, which is open, and a closed end surface at the other end in the slidable direction, and includes a slide restriction member to restrict the held portion so as to slide between the opening and the closed end surface, and
   the held portion is engaged by the slide restriction members and the closed end surface.

\* \* \* \* \*